United States Patent
Hlibiciuc et al.

(10) Patent No.: US 7,860,001 B2
(45) Date of Patent: Dec. 28, 2010

(54) TELECOMMUNICATIONS METHOD AND SYSTEM INVOLVING ACTIVE NODES HAVING FULL RECEIVE STATE AND ISOLATED RECEIVE STATE FROM NON-ALLOCATED TRAFFIC

(75) Inventors: Alexandru Hlibiciuc, Aachen (DE); Robert Schnell, Aachen (DE); Frank Uretschlaeger, Herzogenrath (DE); Boris Sumic, Zagreb (HR); Una Vizek, Zagreb (HR)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 203 days.

(21) Appl. No.: 12/058,388

(22) Filed: Mar. 28, 2008

(65) Prior Publication Data

US 2008/0239950 A1  Oct. 2, 2008

Related U.S. Application Data

(60) Provisional application No. 60/909,557, filed on Apr. 2, 2007.

(51) Int. Cl.
*G01R 31/08* (2006.01)
*G06F 15/173* (2006.01)

(52) U.S. Cl. .................................. 370/230; 709/241
(58) Field of Classification Search ................. 370/230, 370/356; 709/241
See application file for complete search history.

(56) References Cited

U.S. PATENT DOCUMENTS

| 5,541,987 | A | 7/1996 | Topper et al. |
| 7,103,037 | B2 * | 9/2006 | Roque et al. ................. 370/356 |
| 2004/0264671 | A1 * | 12/2004 | Lamberton et al. ...... 379/221.03 |
| 2006/0209695 | A1 * | 9/2006 | Archer et al. ................ 370/235 |

FOREIGN PATENT DOCUMENTS

EP  1 339 242 A1  8/2003

OTHER PUBLICATIONS

Moneault et al.,Internet Draft RFC3332bis, Network working Group, Feb. 2006, The Internet Society, 1-113.*

* cited by examiner

*Primary Examiner*—Derrick W Ferris
*Assistant Examiner*—Angel Brockman

(57) ABSTRACT

A telecommunications system. The system includes a communications network. The system includes N nodes, where N is an integer greater than or equal to 2, which run a same or different applications and process a same or different ranges of application level traffic, and which communicate with each other through the network using signaling by SIGTRAN protocols. Each of the N nodes has a full receive state where a node receives any type of traffic from the other nodes and an isolated receive state where the node only receives allocated traffic from the other nodes. The node sends traffic to the other nodes whether the node is in the full receive state or the isolated receive state. A method for communicating.

24 Claims, 2 Drawing Sheets

TELECOMMUNICATIONS METHOD AND SYSTEM INVOLVING ACTIVE NODES HAVING FULL RECEIVE STATE AND ISOLATED RECEIVE STATE FROM NON-ALLOCATED TRAFFIC

CROSS-REFERENCE TO RELATED APPLICATIONS

This application claims the benefit of U.S. Provisional Application No. 60/909,557 filed Apr. 2, 2007, the disclosure of which is incorporated herein by reference.

FIELD OF THE INVENTION

The present invention is related to a telecommunications system where active nodes in an isolated received state still send allocated traffic to other nodes in a full receive or in ban isolated received state using signaling by SIGTRAN protocols. (As used herein, references to the "present invention" or "invention" relate to exemplary embodiments and not necessarily to every embodiment encompassed by the appended claims.) More specifically, the present invention is related to a telecommunications system where active nodes in an isolated received state still send allocated traffic to other nodes in a full receive or in an isolated received state using signaling by SIGTRAN protocols where allocated traffic includes signaling traffic related to established sessions, calls or started transactions being received by the node from the other nodes, and traffic from other nodes to which the node has started sending traffic when the node is in the isolated received state.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

SIGTRAN WG of IETF has defined a set of protocols that enable transport of signaling protocols, such as SS7, V5, DSS1. DPNSS or Q-SIG, over IP networks.

Some of SIGTRAN xxUAs in addition to the concept of Application Server and Routing Key based on SS7 addressing parameters use special mechanisms that allow identifying traffic allocated to particular Signaling Processes, and traffic, which has not been allocated to any signaling process yet, for example SUA defines TID and DRN Labels, which can be provided in ASPTM ACTIVE message to indicate that the signaling process is able to process traffic for particular ranges of destination TIDs and DRNs: SUA messages that do not contain a destination TID or a DRN relate to non-allocated traffic and can be load-shared between the active processes for the concerned application server.

Some SIGTRAN implementations can perform load-sharing of SIGTRAN traffic using a weighted round robin method, the traffic is load-shared between the active processes of the concerned application server. Active signaling Processes having the weight of zero for an application server are not sent any traffic, unless all other active signaling processes have weight zero too.

Existing SIGTRAN standards and implementations do not allow for graceful change of signaling process states from ACTIVE to INACTIVE or DOWN, that is, there is no procedure defined by SIGTRAN protocols that allows for graceful changeover of traffic distribution from signaling process that intend to go INACTIVE from ACTIVE state without loss of allocated traffic.

Existing standards and implementations always assume that their peer signaling processes active for the application server are able to take any signaling traffic destined to the application server. This fact comes in conflict with SUA standard since one Signaling Process cannot be active for more than one TID or DRN label. Therefore, as soon as a signaling process becomes inactive other signaling processes cannot take over traffic destined to destination TIDs and DRNs defined by the TID and DRN labels of the inactive process and application server. For this reason the signaling process, which is going inactive, has to forward all non-allocated incoming traffic to other signaling processes capable of processing it as long as the process stays active although the loadsharing function is already in place at the remote signaling process.

An inactive signaling process, for example, ASP, is not able either to send nor receive any traffic from its peers (SGPs). For that reason an inactive process cannot perform test calls or any other maintenance related functions that require signaling communication with remote/distributed functional entities. However, once the signaling processes becomes active for an AS, it starts to receive the full range of new non-allocated traffic destined to the AS, although the purpose of activating the process was to perform only maintenance activities on the AS in the signaling process.

SUA standard does not define mechanisms to identify allocated/non-allocated traffic going towards SUA SGPs and does not define traffic management procedures dealing with corresponding call related stateful information at the SGPs.

BRIEF SUMMARY OF THE INVENTION

The present invention pertains to a telecommunications system. The system comprises a communications network. The system comprises N nodes, where N is an integer greater than or equal to 2, which run a same application, and which communicate with each other through the network using signaling by SIGTRAN protocols. Some nodes process a same range of application level traffic; they form an Application Server, which processes the range of application traffic. Each of the N nodes has a full receive state where a node receives any type of traffic from the other nodes and an isolated receive state where the node only receives allocated traffic from the other nodes. The node sends traffic to the other nodes whether the node is in the full receive state or the isolated receive state.

The present invention pertains to a method for communicating. The method comprises the steps of receiving any type of traffic by a node having a full receive state from other nodes which communicate with each other through a communications network using signaling by SIGTRAN protocols. There is the step of sending by the node traffic to other nodes while the node is in the full receive state. There is the step of changing the full receive state of the node to an isolated receive state where the node only receives allocated traffic from other nodes. There is the step of receiving only allocated traffic by the node from other nodes. There is the step of sending by the node traffic to other nodes while the node is in the isolated receive state.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 2:
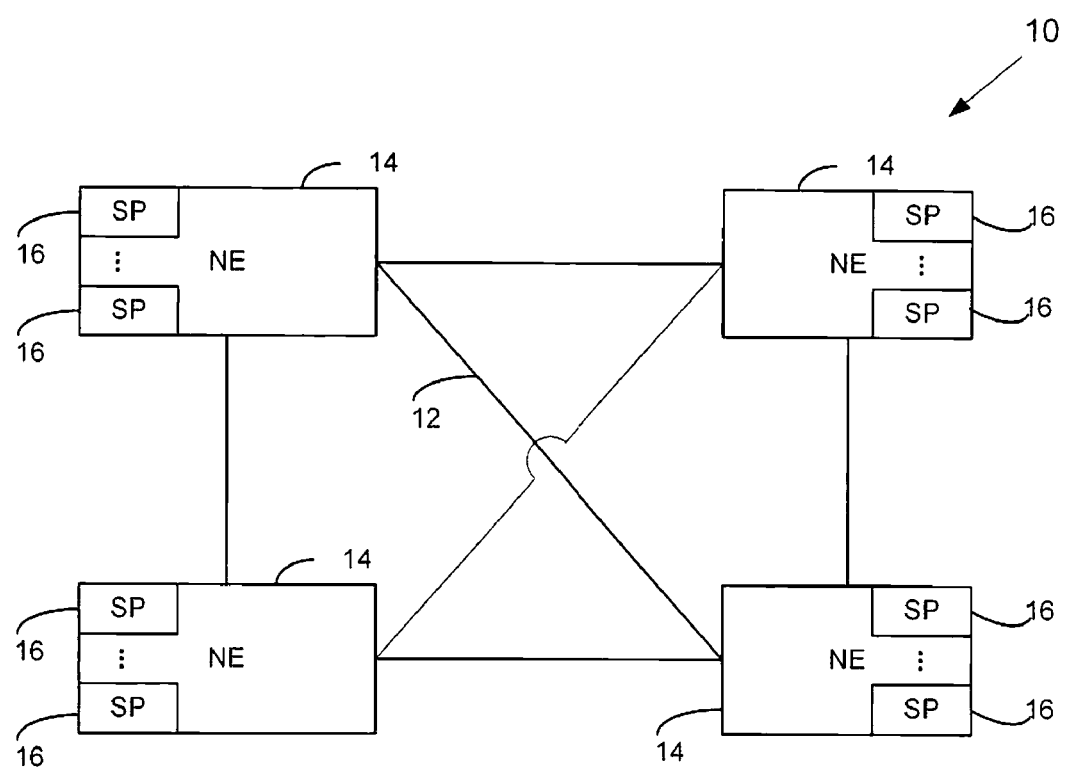
FIG. 2 is a block diagram of the system of the present invention.

Referring now to the drawings wherein like reference numerals refer to similar or identical parts throughout the several views, and more specifically to FIG. 2 thereof, there is shown a telecommunications system 10. The system 10 comprises a communications network 12. The system 10 comprises N nodes 14, where N is an integer greater than or equal to 2, which run a same application and which communicate with each other through the network 12 using signaling, preferably, by SIGTRAN protocols. Some nodes process a same range of application level traffic; they form an Application Server, which processes the range of application traffic. Each of the N nodes 14 has a full receive state where a node 14 receives any type of traffic from the other nodes 14 and an isolated receive state where the node 14 only receives allocated traffic from the other nodes 14. The node 14 sends traffic to the other nodes 14 whether the node 14 is in the full receive state or the isolated receive state.

Preferably, the allocated traffic includes signaling traffic related to established sessions, calls or started transactions being received by the node 14 from the other nodes 14, and traffic from other nodes 14 to which the node 14 has started sending traffic when the node 14 is in the isolated received state. The node 14 preferably does not send non-allocated traffic to another node 14 in an isolated receive state. Preferably, the communications network 12 is an EP network 12. The EP network 12 preferably is a SIGTRAN network 12.

Preferably, each node 14 has at least one signaling process 16. The node 14 in the isolated receive state preferably sends traffic to the other nodes 14 which are active. Preferably, the node 14 sends messages that include an indicator which identifies the full receive state of the node 14. Preferably, the node 14 sends messages that include an indicator which identifies the isolated receive state of the node 14. The node 14 preferably changes from the isolated receive state to the full receive state. The node 14 preferably changes from the full receive state to the isolated receive state. Preferably, when allocated traffic received at the node 14, which is in an isolated receive state, is less than a predetermined amount, or a predetermined time period expires, the node 14 becomes inactive. The signaling processes 16 preferably have weights which define their processing capabilities of handling traffic.

The present invention pertains to a method for communicating. The method comprises the steps of receiving any type of traffic by a node 14 having a full receive state from other nodes 14 which communicate with each other through a communications network 12 using signaling, preferably, by SIGTRAN protocols. The node 14 and other nodes 14 run a same application. There is the step of sending by the node 14 traffic to other nodes 14 while the node 14 is in the full receive state. There is the step of changing the full receive state of the node 14 to an isolated receive state where the node 14 only receives allocated traffic from other nodes 14. There is the step of receiving only allocated traffic by the node 14 from other nodes 14. There is the step of sending by the node 14 traffic to other nodes 14 while the node 14 is in the isolated receive state.

The receiving only allocated traffic step preferably includes the step of receiving only allocated traffic where allocated traffic includes signaling traffic related to established sessions, calls or started transactions being received by the node 14 from other nodes 14, and traffic from other nodes 14 to which the node 14 has started sending traffic when the node 14 is in the isolated received state. Preferably, the sending by the node 14 in the isolated receive state step includes the step of the node 14 not sending non-allocated traffic to another node 14 in an isolated receive state.

The receiving any type of traffic step preferably includes the step of receiving any type of traffic by the node 14 having a full receive state from other nodes 14 which communicate with each other through an IP communications network 12 using signaling. Preferably, the receiving any type of traffic step includes the step of receiving any type of traffic by the node 14 having a full receive state from other nodes 14 which communicate with each other through a SIGTRAN communications network 12 using signaling. There is preferably the step of operating by each node 14 at least one signaling process 16.

Preferably, the sending by the node 14 traffic to other nodes 14 while the node 14 is in the isolated receive state includes the step of sending by the node 14 in the isolated receive state traffic to other nodes 14 which are active or in full receive state. There is preferably the step of the node 14 sending messages that include an indicator which identifies the isolated receive state of the node 14 to other nodes 14. Preferably, there is the step of the node 14 changing from the isolated receive state to the full receive state. There is preferably the step of the node 14 becoming inactive when allocated traffic received at the node 14, which is in an isolated receive state, is less than a predetermined amount, or a predetermined time period expires. There is preferably the step of the node 14 changing from the full receive state to isolated receive state, when allocated traffic received at the node 14, is less than a predetermined amount, or a predetermined time period expires. There is the step of changing the isolated receive state of the node to an inactive state where the node does not send and does not receive any application level traffic to and from other nodes. There is the step of changing the inactive state of the node to the isolated receive state where the node does not send and does not receive any application level traffic to and from other nodes. There is the step of changing the isolated receive state of the node to the full receive state.

Preferably, there is the step of defining the signaling processes 16 processing capabilities of handling traffic based on weights of the signal processes 16, preferably, per an Application Server or a Routing Key.

In the operation of the invention, a communication network 12 consists of nodes 14 (network elements). Nodes 14 can send messages to other nodes 14 and receive messages from other nodes 14. Send and receive messages represent traffic, signaling traffic or simply signaling. A node 14 will only receive a message if the message is destined to the node 14 (at a certain protocol layer). Nodes 14 of the network 12 provide services. Nodes 14 can implement different functions which altogether realize the service. That is, nodes 14 can be of various types. Signaling messages received by the node 14 represent incoming traffic. Signaling messages sent by the node 14 represent outgoing traffic.

Signaling process 16 is a logical entity which resides at the node 14 and provides a means for communication between the nodes 14. One can implement one or several signaling processes 16 within a node 14. One can also treat signaling processes 16 as HW entities. The term "signaling process" is from the SIGTRAN working group in IETF, but one can use it with a wider scope which goes beyond the SIGTRAN responsibility. A signaling process 16 is said to be in "Active" state, preferably, per Application Server, if it can receive any application level messages and send any messages according to existing provisions (e.g. standards). A signaling process 16 is said to be in "Inactive" state, preferably per Application Server, if it shall not send any messages (that belong to application protocol layer, or optionally lower protocol layers) and shall not be sent any messages (that belong to application protocol layer, or optionally lower protocol layers). The states "Active" and "Inactive", preferably, apply per Application Server or a Routing Key served by the signalling process.

Allocated traffic consists of all messages that relate to an ongoing call, session, transaction, connection, association or any other ongoing procedure within the node 14. For example it can be a procedure that belongs to the application Layer, or to other layers in the protocol stack. Normally, allocated traffic is identified based on presence and values of information elements of the message. The concerned information elements can be from any of the concerned protocols in a protocol stack.

Non-Allocated traffic consists of all messages that start, preferably, a call, session, transaction, connection, association or any other procedure within the node 14. From the perspective of the message receiving node 14, the message does not belong to any ongoing task (call, session, transaction, procedure). From the sending node 14 perspective, the message starts a task which is allocated locally, therefore, corresponding reply(-ies) belong(s) to allocated traffic.

A signaling process 16 is said to be in "received isolated" state if it shall NOT be sent any messages of non-allocated traffic. A signaling process 16 in "Isolated" state can send allocated and non-allocated traffic to signaling processes 16 in "Active" state. In particular, this means that a signaling process 16 in "Isolated" state can start new traffic to signaling processes 16 in "Active" and accordingly signaling processes 16 in "Active" can send traffic in response.

In regard to isolation for the ACTIVE state of nodes 14 or Application Servers, isolation defines additional sub-states of the ACTIVE state. That is, a node 14 or Application Server in the ACTIVE state can be in full receive state or in isolated receive state. Internally, the signaling process and served application server or node 14 has two sub-states for the isolated receive state—"isolating receive" and "full isolated receive" states.

"Isolating receive" is the intermediate state between "full receive" and "full isolated receive" states. When isolation of the application server or node 14 is triggered, the application server or node 14 first changes its state to "isolating receive" and informs its peers by including an indication of "isolated receive" state in a message sent to peer signaling processes 16. Peer signaling processes 16 acknowledge the corresponding message and stop sending non-allocated traffic to the isolated process.

The application server or node 14 in "isolating receive" state enters "full isolated receive" state, when all sessions, calls, transactions and similar, which have been started when the Application Server or node 14 was in "full receive" state, gracefully end or are aborted.

When being in "full isolated receive" the application server served by a signalling process or node 14 can start new sessions, calls or transactions, and signaling peers are responsible to forward corresponding traffic or responses back to the originating signaling process or node 14. That is, the application server served by a signalling process or node 14 in "full isolated receive" state can only have sessions, calls or transactions that originate from the signalling process and application server within, or the node 14 itself.

It is suggested that signaling processes 16 in ASPTM procedures are capable to indicate their isolation state, that is, indicate the state when the signaling process 16 can still process allocated traffic and shall not participate in distribution of new (non-allocated traffic) from its peer signaling processes 16. The decision of a signaling process 16 to isolate itself for a particular AS might be dynamically based on local conditions present on the signaling process 16 side.

If ASPTM messages support automated indication of signaling process 16 weights per served application server, the peer signaling processes 16 can interpret the weight of zero as an indication of isolation of the signaling process 16 from distribution of new (non-allocated) traffic for the served AS. This weight might be dynamically adapted to the local conditions present at the initiating signaling process 16 side, e.g. processing capacity, memory, etc.

An isolated signaling process 16 can serve allocated traffic and is thus able to wait until the ongoing traffic gracefully dies away. An isolated node 14 is able to carry out maintenance procedures requiring communication such as test calls/sessions.

The following procedures are possible to use to indicate an isolated or non-isolated situation:
   When going Active for an AS, signaling processes 16 will be able to indicate their isolation state for the AS.
   When being Active and non-isolated for an AS, signaling processes 16 will be able to isolate themselves from non-allocated traffic.
   When being Active but isolated from non-allocated traffic for an AS, signaling processes 16 will be able to able-isolate themselves, and start receiving non-allocated traffic.

In SUA allocated traffic is recognized based on presence of destination TID and DRN in the signaling message. SIGTRAN adaptation layers other than SUA may use any other appropriate means to differentiate allocated and non-allocated traffic. To identify allocated traffic the node 14 can use any appropriate information elements included in the message at any protocol level.

Preferably, indications of "isolated receive" state or "full receive" state is exchanged at the signaling transport level and should be included in signaling transport protocol messages.

Then all applications using the same signaling transport protocol can re-use a same common mechanism of indicating "isolated receive" state or "full receive" state of signaling processes to their peer signaling processes at a signaling transport level. This also includes the case when the states "full receive" and "isolated receive" are per application within a node, then the granularity of the corresponding signaling transport relations shall be at least per application entity.

This is beneficial when multiple applications at the node share the same signaling transport relation towards another node and one or more applications at the node need to be isolated separately from other applications in the same node.

SIGTRAN defines routing key (that is traffic range) as a pair [set of originating addresses, set of destination addresses]. IPSP-IPSP communication case, a traffic range definition implies the direction of traffic messages. Preferably, the states "full receive" and "isolated receive" apply per traffic range served by signaling process. When a signaling process serves multiple traffic ranges then each traffic range can be isolated separately from other traffic ranges.

Some applications may have dedicated procedures for isolation and de-isolation included in application level protocols. Then the states "full receive" and "isolated receive" are per application within a node.

Signaling processes 16 may use any appropriate message to change the isolation state, possibly a new message may be introduced if needed. From the existing ASPTM messages of SIGTRAN protocols the most appropriate message to carry the indication of the isolation state of the signaling process 16 is the ASPAC (ACTIVE) message. Preferably, signaling peers shall accept change of isolation state. In case ASPAC is used to change isolation state the peer process shall answer with ASPAC Ack.

Since SGP processes are not able to send ASPAC messages, SGPs may use for instance NTFY or unsolicited ASPAC Ack messages to indicate their isolation state for ASes. SGP-ASP communication is for signaling transport purposes only. In this case, the node hosting SGP signaling process does not have any application and the node runs only signaling transport protocol layers. That is, SGP does not have its own traffic range that it processes. However, even in this case it can be beneficial to isolate the SGP per transferred traffic range. That is, preferably. SGP can isolate each provisioned RK, and indicate this separately to concerned ASPs serving the RK isolated from the SGP.

Since IPSPs combine functions of both SGPs and ASPs, depending on the chosen solution and exchange mode in use they can indicate isolation state in NTFY, ASPAC, or unsolicited ASPAC Ack messages.

Isolation state may apply for one or more ASes/RKs served by the signaling process 16. Therefore signaling processes 16 should indicate corresponding RCs of the concerned application servers, if needed.

When the amount of allocated traffic at the signaling process 16, which is going isolated, becomes lesser than a predetermined value (e.g. the number of active calls is less than a given threshold) or a certain time period expires the isolated signaling process 16 might change its state to inactive for the concerned application server by sending the appropriate message as explained above.

A signaling process 16 can go Active for an AS and indicate its state as being active and isolated. Then the signaling process 16 is able to perform maintenance actions that require application level signaling and initiate test activities, where isolated state of the process guaranties that its peer-signaling processes 16 will only send allocated traffic to it.

Signaling Processes 16 may have (dynamically adapted) absolute weights, which define their processing capabilities of handling traffic for one or more ASes. The absolute weight of a signaling process 16 per AS defines the portion of new (non-allocated) traffic sent to the process for the AS from its peers in their current load-distribution scheme, that is, it defines capacity of the signaling process 16 in absolute capacity units. Therefore, the percentage of non-allocated traffic that a signaling process 16 will be sent by its peers for an AS is $$P_i = 100 \frac{W_i}{\sum W_j} \quad (1)$$

where $P_i$ is the percentage of traffic for active process i. $W_i$ is its absolute weight within the Application Server, and $W_1$ in denominator are slummed across all active signaling processes 16 within the Application Server. It is assumed that all weights $W_i$ are non-negative.

Thus, absolute weight of signaling process 16 within an AS indicates signaling process 16 capacity with respect to serving traffic for the AS.

Although conceptually the weight of value zero and the isolated state are different, in some implementations it might be appropriate to associate absolute weight of value zero with process being in isolated state within AS.

Normally, the zero value of Weight parameter eliminates the signaling process 16 from the load distribution scheme for a particular AS. When the zero value of Weight parameter means isolated state of the signaling process 16, formula (1) above defines $P_i$ to be 0 when the sum over all $W_i$ is 0, in order to have a well defined behavior when all ASPs serving this AS are isolated. Thus, in case all signaling processes 16 of an AS are isolated they will only get already allocated traffic, and peer signaling processes 16 at message routing have to reject all outgoing new (non-allocated) traffic towards the AS.

The case, when all signaling processes 16 serving an Application Server have weight value zero, can have an alternative handling in the peer signaling processes. When all signaling processes 16 serving an Application Server change to receive isolated state and either a predetermined time period expires, or when all allocated traffic sent to the Application Server and its signaling processes 16, is less than a predetermined amount, then the peer signaling process 16, preferably, performs the step of the remote Application Server changing from the isolated receive state to the Inactive state. That is, all peer signaling processes preferably assume the Application Server has Inactive state. Then the peer node 14 sends outgoing traffic to other Application Servers capable of handling corresponding application traffic. That is, nodes 14 use application level function selecting the target Application Server per each new call, session, or transaction, taking in consideration the state of peer application servers. In particular, in case of SIGTRAN SGP to ASP scenario, the Signalling Gateway is an intermediate node, which preferably performs the step of the Application Server changing from the isolated receive state to the Inactive state, and sends indications that the Application Server has Inactive state to all peer nodes of the Application Server. For example the Signalling Gateway can send in that case MTP3 TFP, TCP, or M3UA DUNA messages to concerned nodes 14 in the system 10.

Signaling Processes 16 can implement an automated procedure of changing absolute weight of a signaling process 16 per Application Server. Similar to the Isolation state, absolute weight can be provided in the ASPAC message or in any other appropriate message, in case of an SGP process ASPAC Ack or NTFY messages can be used. In case the absolute weight of the signaling process 16 changes within an AS, the signaling process 16 can inform its peers by resending the corresponding message (e.g. ASPAC) with a new value of the absolute weight included.

In case the SGP is part of a cluster of SGPs, the SGP may include in ASPAC Ack message its own absolute weight for the concerned AS. If so, the peer ASP has to consider the SGP absolute weight when distributing outgoing traffic to SGPs within the SG.

This method of automated exchange of relative capacity is applicable in both directions, that is, ASPs can actively provide their absolute weight to SGPs by sending "unexpected" ASPAC messages with the new process weight, while SGPs can send NTFY or "unexpected" ASPAC Ack with the new weight included. IPSPs can exchange their absolute weights in ASes similarly in ASPAC and ASPAC Ack or in NTFY messages. ASPAC Ack messages need to carry absolute weights only in case SE is used. In case of DE it is sufficient that weight is carried in ASPAC messages.

Whatever message is used to carry the process weight, the general format of the weight information element should preferably include two parameters, first the value of weight of the signaling process, and second the Routing Context value that identifies the AS or RK for which the weight applies.

It is noteworthy that in case the weight of a signaling process 16 is the same for all its Application Servers signaling processes 16 can use ASPSM messages such as ASPUP to indicate their absolute weight to their peers. However, this would prevent the processes 16 from changing their weights while being in ACTIVE state.

Below is an implementation example, where the isolation state is indicated to signaling process 16 peers by change of process absolute weight within AS.

In the following based on an SUA example procedures are described for changing of absolute weights of a signaling process 16 and its isolation state.

Consider an SGP process and a number of ASP processes ASP1 . . . ASPn which serve more or more ASes.

ASPSM procedures that bring the ASP signaling processes 16 in INACTIVE states, or ASP UP state, are omitted, although in some implementations they also can transfer process weights.

Figure 1:
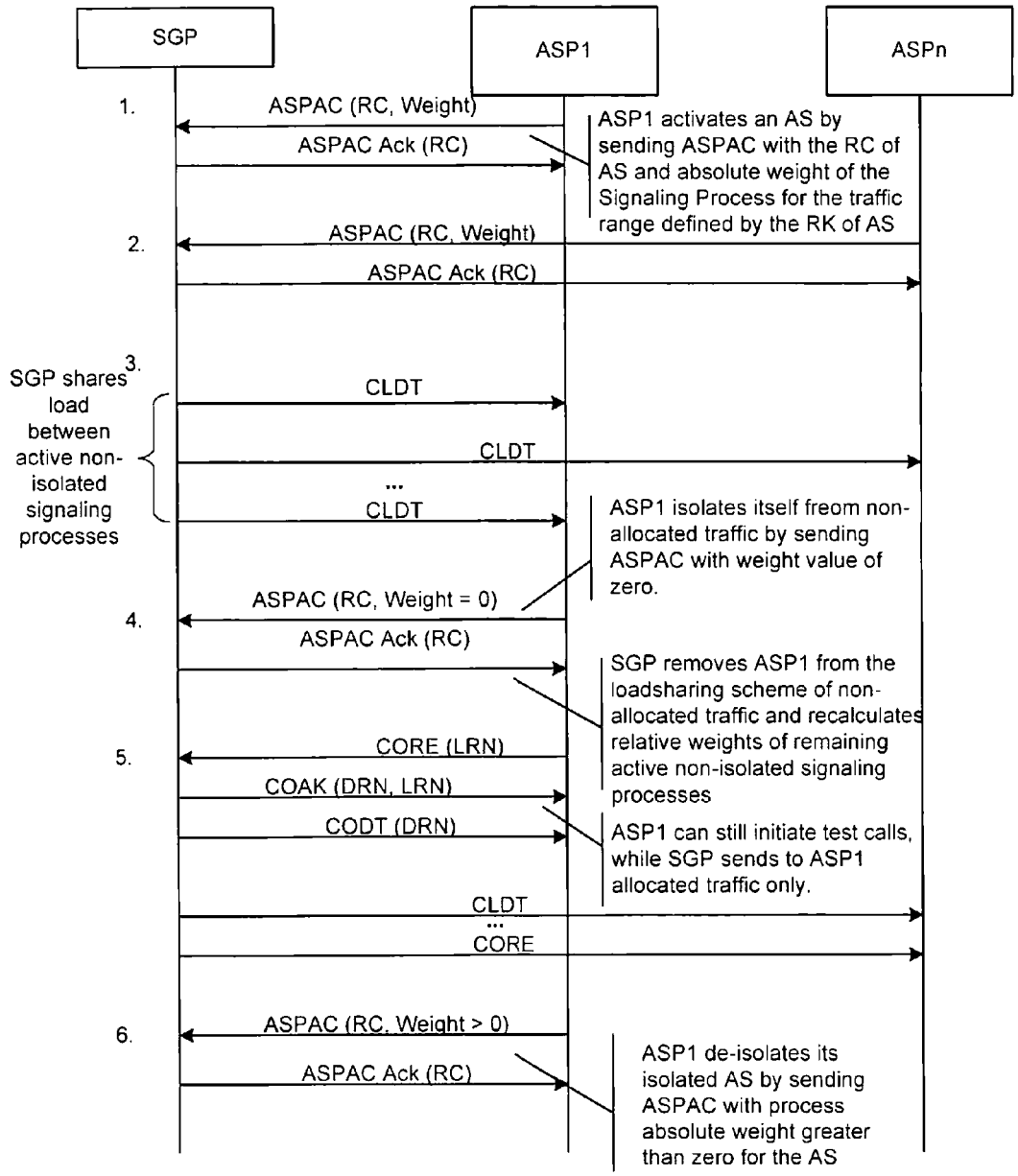
FIG. 1 is message flow at isolation and de-isolation of a signaling process.

FIG. 1 shows in steps the procedures. At step 1 ASP1 activates its AS(es) and provides for each AS its absolute weight. On receiving an ASPAC message with absolute weight(s) included, the Signaling Process 16 (SGP) stores Process Weight parameter per AS for further use in traffic distribution. Then the SGP recalculates the percentage of non-allocated traffic to be distributed for each of the signaling processes 16 that serve the same AS according to formula (1) above, includes the ASP1 in the loadsharing group of processes and acknowledges the ASPAC message by sending ASPAC Ack.

In case the SGP is part of a cluster of SGPs, the SGP may include in ASPAC Ack message its own absolute weight for the concerned AS (note shown in FIG. 1). Then the ASP1 has to consider the SGP absolute weight when distributing outgoing traffic to SGPs within the SG. For that reason, when the ASPAC Ack is received with weight parameter included, the ASP1 recalculates percentage of traffic to be sent from the AS to the SGP accordingly. In case of multiple SG scenarios, the first traffic distribution procedure that applies is selection of the SG, that is, route selection. When the SG is selected the SGP is selected according to its calculated traffic percentage.

At step 2 similarly to step 1 ASPn and all other ASPs activate their AS(es) and provide corresponding absolute weights.

Step 3. Then SGP distributes non-allocated outgoing signaling to signaling processes 16 according to their computed traffic percentage. Allocated signaling is distributed based on load sharing labels determined based on information elements contained in the traffic messages, such as destination TID, DRNs etc.

At step 4. ASP1 isolates itself from non-allocated traffic by sending ASPAC with weight value of zero to the SGP. When SGP receives the ASPAC message it recalculates the percentage of traffic for each of the signaling processes 16 serving the AS. Since the weight of ASP1 within the AS is zero, the SGP removes ASP1 from the loadsharing group for the non-allocated traffic destined to the AS. ASP1 is still active, therefore, the SGP continues to send allocated traffic to the ASP1, e.g. based on DRN and TID labels.

After step 4, since ASP1 is still active, it can send traffic as it wishes. For instance at step 5 ASP1 can initiate calls or any wanted test cases, or perform maintenance procedures. All subsequent allocated signaling traffic from remote peers will reach the isolated signaling process ASP1, so that test cases and maintenance procedures can be successfully performed.

The SGP distributes non-allocated traffic between the non-isolated signaling processes 16, but ASP1 as being isolated will not be sent non-allocated traffic.

At step 6 ASP1 sends an "unsolicited" ASPAC message which includes a process weight greater than zero. The use case is similar to step 1 above. The SGP interprets it as de-isolation instruction.

Then the SGP recalculates the percentage of non-allocated traffic to be distributed for each of the signaling processes 16 that serve the same AS, includes the ASP1 in the loadsharing group of processes and acknowledges the ASPAC message by sending ASPAC Ack.

Local connection references in use at SGPs can serve to their peers to identify allocated traffic. For this reason the DRN labels can be associated with each SGP within a SUA SG.

Then SUA ASP shall use DRN labels of the SGPs to distribute allocated traffic between the SGPs.

SGPs can distribute their DRN labels to their peer ASPs automatically in ASPAC Ack messages in response to received ASPACs. When the ASP receives a DRN Label IE it shall store it for further use at distribution of CO traffic to the concerned SG.

When ASPs use DRN labels for SGPs, the message latency is decreased since traffic messages are always sent to the proper SGP, and SGPs do not need to forward internally between them CO traffic, nor do they need to synchronize the connection sections data.

When SUA SGPs have call related stateful information, for example in case they run coupled operation for CO traffic and use DRN labels for their own LRNs, then isolation of signaling process 16 from non-allocated traffic as described above applies to SUA SGPs as well.

There can be a system set up where isolated processes do not indicate their isolation state and even weight to external peers, but to the signaling processes of their own logical entity (same SG, or AS). This set up is needed for the case where external peers do not understand the semantics of weights and isolation states. Therefore, in this set up it makes sense to call the weights and isolation states "internal".

Thus, the internally isolated processes stay active for the concerned ASes and keep on receiving allocated and non-allocated traffic from external peers. Internally isolated processes cannot accept any new traffic and, therefore, have to distribute it further to internally non-isolated processes of the same logical entity for further processing.

Non-isolated signaling processes use internally adopted traffic distribution algorithm to accept new traffic or to forward it to other (internally non-isolated) processes of the same logical entity according to their internal weights. Those signaling processes are expected to accept the non-allocated traffic, so that all subsequent traffic will be forwarded directly to them from external SIGTRAN peers.

The mechanisms/procedures described above for Change of Signaling Process Weights and Isolation States apply to internal inter-process Change of Signaling Process Weights and Isolation States within a distributed logical entity.

For further understanding of the discussion herein, the following terms are explained.

"Traffic Range" is a logical concept that designates all messages sent from a set of originating addresses to another set of destination addresses. It is required that the set of originating addresses does not overlap with the set of destination addresses. According to this definition, the concept of traffic range is essentially unidirectional, that is, if the set of originating addresses is exchanged with the set of destination addresses then a different traffic range is defined. In SIGTRAN standard documents the concept of "Routing Key" and the concept of "Traffic range" are synonyms, but "Routing Key" is adopted as the official name, which is also used for "Routing Key" information element included in SIGTRAN protocols.

For example, in M3UA the pair (2-200, 2-300), where 2-200 is the originating point code and 2-300 is the destination point code, designates a traffic range that is, all messages sent from the address 2-200 to the address 2-300.

The pair (2-300, 2-200) designates a different traffic range which is symmetric to the one above.

Another M3UA example, the pair ({2-200.2-201, 2-203}, {2-300, 2-400}) is a traffic range which designates all messages sent from any of the addresses 2-200, 2-201, 2-203 to any of the addresses 2-300 and 2-400. The concept of address included in the definition of the traffic range can have different scope in different networks and systems. The address can include SS7 parameters such as SS7 point code. Service Indicator or Subsystem Number, it can also include one or more IP addresses and other information elements which identify a node, an application within a node, and possibly application context.

The term Application refers to "Application Layer" in a protocol stack. Application layer is the top layer in the protocol stack. Some examples of application layer definitions are given in Wikipedia:

The application layer is the seventh level of the seven-layer OSI model. It interfaces directly to and performs common application services for the application processes; it also issues requests to the presentation layer.

The common application layer services provide semantic conversion between associated application processes. Note: Examples of common application services of general interest include the virtual file, virtual terminal, and job transfer and manipulation protocols. The application layer of the four layer and five layer TCP/IP models corresponds to the application layer, the presentation layer and session layer in the seven layer OSI model. In telecommunication networks application can refer to for instance SIP. MAP, BSSAP, RANAP, ISUP, TUP.

As a further example, the following are definitions used in the M3UA standard of SIGTRAN.

Application Server (AS)—A logical entity serving a specific Routing Key. An example of an Application Server is a virtual switch element handling all call processing for a signalling relation, identified by an SS7 DPC/OPC. Another example is a virtual database element handling all HLR transactions for a particular SS7 SIO/DPC/OPC combination. The AS contains a set of one or more unique Application Server Processes, of which one or more is normally actively processing traffic. Note that there is a 1:1 relationship between an AS and a Routing Key.

Application Server Process (ASP)—A process instance of an Application Server. An Application Server Process serves as an active or backup process of an Application Server (e.g., part of a distributed virtual switch or database). Examples of ASPs are processes (or process instances) of MGCs, IP SCPs, or EP HLRs. An ASP contains an SCTP endpoint and may be configured to process signalling traffic within more than one Application Server.

IP Server Process (IPSP)—A process instance of an LP-based application. An IPSP is essentially the same as an ASP, except that it uses M3UA in a point-to-point fashion. Conceptually, an IPSP does not use the services of a Signalling Gateway node.

Routing Key—A Routing Key describes a set of SS7 parameters and parameter values that uniquely define the range of signalling traffic to be handled by a particular Application Server. Parameters within the Routing Key cannot extend across more than a single Signalling Point Management Cluster.

Routing Context—A value that uniquely identifies a Routing Key. Routing Context values are configured either using a configuration management interface, or by using the routing key management procedures defined in this document.

Signaling End Point (SEP)—A node in the SS7 network associated with an originating or terminating local exchange (switch) or a gateway exchange.

Signalling Gateway Process (SGP)—A process instance of a Signalling Gateway. It serves as an active, backup, load-sharing, or broadcast process of a Signalling Gateway.

Signaling Gateway (SG)—An SG is a signaling agent that receives/sends SCN native signaling at the edge of the IP network [12]. An SG appears to the SS7 network as an SS7 Signaling Point. An SG contains a set of one or more unique Signalling Gateway Processes, of which one or more is normally actively processing traffic. Where an SG contains more than one SGP, the SG is a logical entity, and the contained SGPs are assumed to be coordinated into a single management view to the SS7 network and to the supported Application Servers.

Signalling Process—A process instance that uses M3UA to communicate with other signaling processes. An ASP, an SGP, and an IPSP are all signalling processes.

Other SIGTRAN protocols adapt these definitions for their purposes.

Internal communication of a signalling process serving an application server refers to communication of the signalling process to another signalling process that serves a same application server. This definition applies to ASP and IPSP signalling processes.

Internal communication of a signalling gateway process (SGP) serving a Signalling Gateway refers to communication of the SGP to other SGPs which serve the same Signalling Gateway.

The attribute of "external" with respect to an Application Server is qualifying a certain object, procedure or entity that relates to the Application Server and its communication with other entities outside (beyond or not within or part of) the application server. External procedures in an Application Server happen between the entities that implement the Application Server and entities residing outside the application server, such as Signalling Gateways. SGPs, remote nodes etc.

Hash value is a well-known concept, where the definition is "A hash function is any well-defined procedure or mathematical function for turning some kind of data into a relatively small integer, that may serve as an index into an array. The values returned by a hash function are called hash values".

Use of present invention allows for:

Automated isolation of SIGTRAN signaling processes 16 from non-allocated traffic without loss of incoming traffics while keeping the signaling process active Automated de-isolation of SIGTRAN signaling processes 16 from non-allocated traffic Automated change of signaling process 16 capacity while keeping the process active Performing maintenance procedures on a signaling process 16 without exposing the process to non-allocated incoming traffic Reducing traffic processing delays since non-allocated traffic bypasses signaling processes 16 undergoing maintenance procedures SGP DR-N labels improve CO traffic handling and decrease message latencies and put less synchronization burden on SUA SGPs

ABBREVIATIONS

ANSI American National Standards Institute
AS Application Server
ASP Application Server Process
Ack Acknowledgement
ASP SM ASP State Management
ASP TM ASP Traffic Management
ASP*M ASP SM and ASP TM
ASPAC ASP Active
ASPUP ASP Up message
BSSAP Base Station System Application Part
CLDT Connectionless Data Transfer
CN Core Network
Co Connection Oriented
CORE Connection Request
COAK Connection Acknowledge
DE Double Exchange
DPC Destination Point Code
DPNSS Digital Private Network Signaling System
DRN Destination Reference Number
DSS1 Digital Subscriber Signaling No1
DUNA Destination Unavailable message in SIGTRAN protocols
DTID Destination TID
HLR Home Location Register—Subscriber Database
ID Identity
HW Hardware
IE Information Element
IETF Internet Engineering Task Force
IP Internet Protocol
IPSP IP Signaling Process
ISUP Integrated Services Digital Network User Part
LRN Local Reference Number
M3UA MTP3 Users Adaptation Layer
MAP Mobile Application Part
MGC Media Gateway Controller
MTP The Message Transfer Part of the SS7 protocol
MTP3 MTP Level 3, the signaling network layer of SS7
NE Network Element
NTFY Notify
OPC Originating Point Code
OTID Originating TID
OSI Open Systems Interconnection
Q-SIG Standard PBX Signaling System
RAN Radio Access Network
RANAP Radio Access Network Application Protocol
RC Routing Context
RK Routing Key
SCP Service Control Point
SCTP Stream Control Transmission Protocol
SE Single Exchange
SEP SS7 Signaling Endpoinit
SG Signaling Gateway
SGP Signaling Gateway Process
SGW Signaling Gateway
SIO Service Information Octet
SIGTRAN Signaling TRANsport
SIP Session Initiation Protocol
SS7 Signaling System No7
SUA SCCP User Adaptation layer
TCP Transfer-cluster—prohibited signal in ANSI MTP3
TFP Transfer Prohibited Message in MTP3
TID Transaction TD
TIP Telephone User Part
V5 Access protocol standard, e.g. V5.2
WG Working Group
xxUA SIGTRAN User Adaptation layer, such as M3UA, or SUA Although the invention has been described in detail in the foregoing embodiments for the purpose of illustration, it is to be understood that such detail is solely for that purpose and that variations can be made therein by those skilled in the alt without departing from the spirit and scope of the invention except as it may be described by the following claims.

The invention claimed is:

1. A telecommunications system comprising:
a communications network;
N nodes, where N is an integer greater than or equal to 2, which run a same application and process a same range of application level traffic, which communicate with each other through the network using signaling protocols, each of the N nodes having a full receive state where a node receives any type of traffic from the other nodes and an isolated receive state where the node only receives allocated traffic from the other nodes, the node sending traffic to the other nodes whether the node is in the full receive state or the isolated receive state; and
a signaling process means for recalculating percentages of non-allocated traffic to be sent to signaling processes serving an application server when there is a change of weight of at least one signaling process that serves the application server, and wherein the receiving only allocated traffic step includes the step of computing a hash value from the message parameters and the hash value discriminating allocated traffic from non-allocated traffic.

2. A system as described in claim 1 wherein the allocated traffic includes signaling traffic related to established sessions, calls or started transactions being received by the node from the other nodes, and traffic from other nodes to which the node has started sending traffic when the node is in the isolated received state.

3. A system as described in claim 2 wherein the node in the isolated receive state sends traffic to the other nodes which are active.

4. A system as described in claim 1 wherein the node does not send non-allocated traffic to another node in an isolated receive state.

5. A system as described in claim 4 wherein the IP network is a SIGTRAN network.

6. A system as described in claim 1 wherein the communications network is an IP network.

7. A system as described in claim 1 wherein each of the N nodes has at least one signaling process.

8. A system as described in claim 1 wherein the N nodes include an intermediate node which transfers traffic to the other nodes in the isolated receive state, and, if all the other nodes processing a same range of traffic are in the isolated receive state, then the intermediate node notifies the node about unavailability of processing resources of the other nodes for the same traffic range or indicates unavailability of the other nodes.

9. A system as described in claim 8 wherein the intermediate node notifies the node about availability of processing resources for the same traffic range or availability of the other nodes, if at least one of the other nodes is capable of processing the same range of traffic and is in the full receive state.

10. A system as described in claim 9 wherein the signaling process of the node serves multiple traffic ranges and each traffic range has an isolated receive state separate from all other of the traffic ranges.

11. A method for communicating comprising the steps of:
receiving any type of traffic by a node having a full receive state from other nodes, which communicate with each other through a communications network using signaling protocols, the node and other nodes run a same application and process a same range of application level traffic;
sending by the node traffic to other nodes while the node is in the full receive state;
changing the full receive state of the node to an isolated receive state where the node only receives allocated traffic from other nodes;
receiving only allocated traffic by the node from other nodes;
recalculating percentages of non-allocated traffic to be sent to signaling processes serving an application server when there is a change of weight of at least one signaling process that serves the application server, wherein the receiving only allocated traffic step includes the step of computing a hash value from the message parameters and the hash value discriminating allocated traffic from non-allocated traffic; and
sending, by the node, traffic to other nodes while the node is in the isolated receive state.

12. A method as described in claim 11 wherein the receiving only allocated traffic step includes the step of receiving only allocated traffic where allocated traffic includes signaling traffic related to established sessions, calls or started transactions being received by the node from other nodes, and traffic from other nodes to which the node has started sending traffic when the node is in the isolated received state, where messages of allocated traffic can be identified based on protocol parameters included in the messages, where multiple protocols are simultaneously inspected.

13. A method as described in claim 12 wherein the sending by the node in the isolated receive state step includes the step of the node not sending non-allocated traffic to another node in an isolated receive state.

14. A method as described in claim 11 wherein the receiving any type of traffic step includes the step of receiving any type of traffic by the node having a full receive state from other nodes which communicate with each other through an IP communications network using signaling.

15. A method as described in claim 11 wherein the receiving any type of traffic step includes the step of receiving any type of traffic by the node having a full receive state from other nodes which communicate with each other through a SIGTRAN communications network using signaling.

16. A method as described in claim 15 including the step of operating by each node at least one signaling process.

17. A method as described in claim 11 wherein the sending, by the node, traffic to other nodes while the node is in the isolated receive state includes the step of sending by the node in the isolated receive state traffic to other nodes which are active.

18. A method as described in claim 17 including the step of the node sending messages that include an indicator which identifies the isolated receive state of the node to other nodes.

19. A method as described in claim 18 including the step of the node changing from the isolated receive state to the full receive state.

20. A method according to claim 18 wherein the sending step includes the step of sending an indicator of isolated receive state or full receive state at a signaling transport level and the indicator is included in signaling transport protocol messages.

21. A method according to claim 18 wherein the sending step includes the step of an indicator of isolated receive state, or full receive state, being sent at an application level and being included in application level protocol messages.

22. A method as described in claim 11 including the step of the node becoming inactive when allocated traffic received at the node, which is in an isolated receive state, is less than a predetermined amount, or a predetermined time period expires.

23. A method as described in claim 11 including the step of the node becoming isolated receive when allocated traffic received at the node, which is in an full receive state, is less than a predetermined amount, or a predetermined time period expires.

24. A method as described in claim 23 including the step of defining the signal processes' processing capabilities of handling traffic based on weights of the signal processes and served application servers.

* * * * *

UNITED STATES PATENT AND TRADEMARK OFFICE
CERTIFICATE OF CORRECTION

| | |
|---|---|
| PATENT NO. | : 7,860,001 B2 |
| APPLICATION NO. | : 12/058388 |
| DATED | : December 28, 2010 |
| INVENTOR(S) | : Hlibiciuc et al. |

It is certified that error appears in the above-identified patent and that said Letters Patent is hereby corrected as shown below:

In Column 1, Line 18, delete "ban" and insert -- an --, therefor.

In Column 1, Line 44, delete "DSS1." and insert -- DSS1, --, therefor.

In Column 2, Line 16, delete "active" and insert -- active, --, therefor.

In Column 3, Line 32, delete "an EP" and insert -- an IP --, therefor.

In Column 3, Line 33, delete "The EP" and insert -- The IP --, therefor.

In Column 6, Lines 28-29, delete "able-isolate" and insert -- de-isolate --, therefor.

In Column 6, Line 56, delete "addresses]." and insert -- addresses]. In --, therefor.

In Column 7, Line 59, delete "$W_1$" and insert -- $W_j$ --, therefor.

In Column 7, Line 60, delete "slummed" and insert -- summed --, therefor.

In Column 9, Line 14, delete "more or" and insert -- one or --, therefor.

In Column 11, Line 6, delete "range" and insert -- range, --, therefor.

In Column 11, Line 37, delete "SIP." and insert -- SIP, --, therefor.

In Column 11, Line 45, delete "element" and insert -- element, --, therefor.

In Column 11, Line 57, delete "EP" and insert -- IP --, therefor.

In Column 11, Lines 61-62, delete "LP-based" and insert -- IP-based --, therefor.

In Column 12, Line 48, delete "Gateways." and insert -- Gateways, --, therefor.

In Column 12, Lines 56-57, delete "traffics" and insert -- traffic, --, therefor.

Signed and Sealed this
Twenty-first Day of February, 2012

David J. Kappos
*Director of the United States Patent and Trademark Office*

CERTIFICATE OF CORRECTION (continued)
U.S. Pat. No. 7,860,001 B2

In Column 13, Line 1, delete "DR-N" and insert -- DRN --, therefor.

In Column 13, Line 3, delete "SGPs" and insert -- SGPs. --, therefor.

In Column 13, Line 57, delete "Endpoinit" and insert -- Endpoint --, therefor.

In Column 14, Line 1, delete "Transaction TD" and insert -- Transaction ID --, therefor.

In Column 14, Line 2, delete "TIP" and insert -- TUP --, therefor.

In Column 14, Line 10, delete "alt" and insert -- art --, therefor.